United States Patent
Rapp et al.

(10) Patent No.: US 7,293,441 B2
(45) Date of Patent: Nov. 13, 2007

(54) PRODUCTION OF VERSATILE CHANNEL LETTER COIL

(75) Inventors: Nancy Rapp, Elkhart, IN (US); Lynn Noesser, Plano, TX (US); David Buffington, Olive Branch, MS (US); Jeremy Kolias, Plano, TX (US); Jeff Condino, Plano, TX (US)

(73) Assignee: Amerimax Building Products, Inc., Plano, TX (US)

( * ) Notice: Subject to any disclaimer, the term of this patent is extended or adjusted under 35 U.S.C. 154(b) by 0 days.

(21) Appl. No.: 10/615,493

(22) Filed: Jul. 8, 2003

(65) Prior Publication Data

US 2004/0115382 A1 Jun. 17, 2004

Related U.S. Application Data

(60) Provisional application No. 60/394,367, filed on Jul. 8, 2002.

(51) Int. Cl.
*B21C 23/24* (2006.01)
*G09F 13/00* (2006.01)

(52) U.S. Cl. .............. 72/47; 72/46; 40/552; 40/615

(58) Field of Classification Search .............. 72/46, 72/379.2, 47; 40/582, 583, 551, 552, 615, 40/574
See application file for complete search history.

(56) References Cited

U.S. PATENT DOCUMENTS

| | | | | |
|---|---|---|---|---|
| 3,751,319 A * | 8/1973 | Green et al. | ................. | 156/242 |
| 3,760,552 A * | 9/1973 | Skoetsch | ...................... | 52/578 |
| 3,937,384 A * | 2/1976 | Minogue et al. | ............ | 228/120 |
| 4,490,933 A * | 1/1985 | Endres et al. | .................. | 40/564 |
| 5,100,732 A * | 3/1992 | Benefiel | ..................... | 428/457 |
| 5,229,214 A * | 7/1993 | Maze et al. | ................. | 428/458 |
| 5,987,727 A * | 11/1999 | Shafik et al. | ............... | 29/527.2 |
| 6,167,740 B1 * | 1/2001 | Lipari et al. | ................... | 72/306 |
| 6,589,603 B1 * | 7/2003 | Cornell et al. | ........... | 427/407.1 |
| 6,594,931 B1 * | 7/2003 | Barton et al. | ................. | 40/552 |
| 6,598,328 B2 * | 7/2003 | Aeling et al. | ................. | 40/615 |
| 6,641,880 B1 * | 11/2003 | Deyak et al. | ............... | 428/35.7 |
| 7,181,875 B2 * | 2/2007 | Lewis | ......................... | 40/551 |
| 2001/0042330 A1 * | 11/2001 | Grate et al. | ................... | 40/552 |
| 2005/0028413 A1 * | 2/2005 | Packer | ........................ | 40/551 |
| 2005/0193605 A1 * | 9/2005 | Ahmadi | ....................... | 40/550 |

* cited by examiner

*Primary Examiner*—Dmitry Suhol
(74) *Attorney, Agent, or Firm*—Gardere Wynne Sewell LLP

(57) ABSTRACT

A versatile system for producing channel letter coil of superior reflectivity and durability is described that includes providing a readily formable substrate. A first reflective material is disposed upon a first surface of the substrate. A second reflective material is disposed upon the first reflective material. An aesthetic material is disposed upon a second surface of the substrate. The entire substrate, with the reflective and aesthetic materials intact, is then rolled into a channel letter coil product, ready for immediate and efficient use in sign production.

20 Claims, 1 Drawing Sheet

PRODUCTION OF VERSATILE CHANNEL LETTER COIL

CROSS-REFERENCE TO RELATED APPLICATIONS

This patent application claims priority of U.S. Provisional Application No. 60/394,367, filed on Jul. 8, 2002.

TECHNICAL FIELD OF THE INVENTION

The invention relates generally to the production of illuminated signs and, more specifically, to apparatus and methods for producing versatile channel letter coil.

BACKGROUND OF THE INVENTION

Channel letter coil is used in the production of illuminated signs that are most often associated with commercial enterprises such as restaurants, stores, and other businesses. Channel letter coil usually comprises a roll of readily formable metal (e.g., thin aluminum). A sign manufacturer takes the channel letter coil and, using a number of tools and methods, forms it into troughs (or channels) disposed upon or within the sign. These channels generally have the shape of particular individual characters (e.g., letters, numbers, symbols). A specialized light source (e.g., neon tubing or LEDs) of a desired shape or configuration is typically then disposed within the channel, and the channel and light may then optionally be covered over by some sort of protective or decorative lens, such as acrylic or film.

Conventionally, the coil material is supplied with a protective coating pre-applied to its surfaces for primarily aesthetic purposes but also, in part, to improve durability during handling, processing, and use. Typically, however, this pre-applied coating comprises a single layer of nominal thickness. Such conventional pre-applied coatings often do not, and are not intended to, enhance the performance or usability of the coil material as used in a finished channel coil sign product.

Manufacturers of finished channel coil sign products therefore often must, or choose to, apply additional coatings to enhance the durability and reflectivity of the channel coil. In some instances (e.g., outdoor signs) additional coatings may also be added to protect the interior of the sign from damaging outdoor conditions. Most often, however, additional coatings are applied to the backside (i.e., inner surface) of the channel coil to increase the effective intensity of the light emitted from the sign, without increasing its required power usage. Otherwise, the sign manufacturer may have to position additional light sources within the channel to achieve the desired illumination.

Exterior coatings may also be applied—as or to the topcoat—to provide various aesthetic effects (e.g., color). Although rolled coil material is typically supplied with some basic pre-painting, as previously noted, these special additional coatings are usually not applied to the coil material until after it has been unrolled and formed into its desired shape. This conventional type of application adds cost and inefficiency into the production process.

SUMMARY OF THE INVENTION

Thus, a versatile channel letter coil with enhanced reflectivity and aesthetic properties, without requiring a user of the coil to apply subsequent coatings, and a system for producing such versatile channel letter coil, is needed. Recognizing this, the present invention provides versatile channel letter coil of increased reflectivity that promotes desired illumination, and provides desired aesthetic effects, without requiring the application of additional coatings after channel formation.

Comprehending this, the present invention provides a system for producing channel letter coil of superior reflectivity and durability. A readily formable substrate is provided. A first layer of reflective material is then disposed upon a first surface of the substrate. A second layer of reflective material is disposed upon the first layer of reflective material. An optional outer aesthetic material is disposed upon a second surface of the substrate, typically opposite the reflective coatings. The substrate, having the reflective materials and any desired aesthetic materials disposed thereon, can then be easily formed into a finished channel letter coil product, ready for immediate and efficient use, without the necessity of applying additional coatings during the manufacturing and forming process Other features and advantages of the present invention will be apparent to those of ordinary skill in the art upon reference to the following detailed description taken in conjunction with the accompanying drawings.

BRIEF DESCRIPTION OF THE DRAWINGS

For a more complete understanding of the present invention, including its features and advantages, reference is made to the following detailed description, taken in conjunction with the following drawing figures. Corresponding numerals and symbols in the different figures refer to corresponding parts unless otherwise indicated.

DETAILED DESCRIPTION OF THE INVENTION

It should be apparent to those of skill in the art, upon reference to this disclosure, that the system and teachings of the present invention are applicable to a wide variety of channel letter coil configurations. For purposes of explanation and illustration, however, the present invention is hereafter described in reference to the production of a channel coil product using coil material of a particular size and composition.

The invention comprises various structures and methods for producing versatile channel letter coil product having superior production and performance characteristics. A channel letter coil of the invention comprises a coil substrate, upon which a series of coatings are disposed. The reflective and aesthetic properties of each coating, and the process of applying those coatings, are selected such that the cumulative effect of the coatings provides a channel letter coil of increased reflectivity. Whereas conventional channel letter coil may have a reflectivity of about 80%, as measured by ASTM International criteria, the present invention provides channel letter coil having reflectivity of above 90%.

Optionally, the selection of coating materials and their application may provide other desired effects, such as specific coloration or selective opacity. These benefits are delivered stock to the end user, without requiring additional treatment after the coil has been shaped and placed. A user can therefore cut production cycle times and costs.

Figure 1:
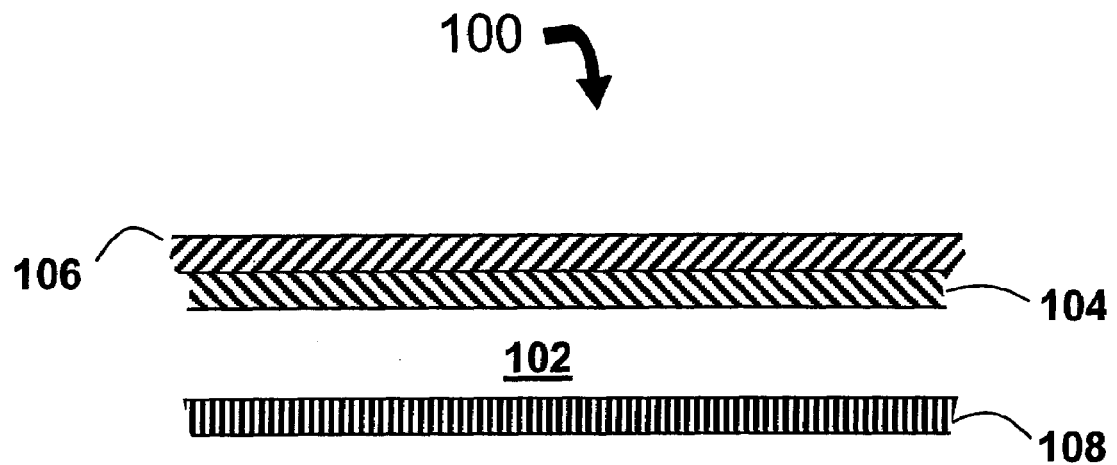
FIG. 1 illustrates an embodiment of channel letter coil material according to the present invention.

A channel letter coil is now described in greater detail with reference to FIG. 1. FIG. 1 provides a cross-sectional representation of segment 100 of channel letter coil stock according to the present invention. Segment 100 comprises substrate 102, having a layer of material 104 disposed upon its inner surface. This surface is commonly referred to as the backside, being the surface that is formed into the inner portion of a finished channel product. A second layer of material 106 is disposed upon layer 104. Segment 100 further comprises a topcoat layer of material 108 disposed upon the outer surface of substrate 102. This outer surface forms the exterior portion of a finished channel product.

Substrate 102 comprises a readily formable metal of a desired size and durability. For example, a commercially available aluminum substrate (e.g., Alloy 3105/Temper H14) may be used. Other similar compositions may be used, in addition to other metals.

Substrate 102 may be provided in a flat sheet configuration, or may come already rolled. If substrate 102 is already rolled, then it should be unrolled. Once a flat substrate 102 is ready, material 104 is applied to the backside surface. Material 104 may comprise a number of coatings, depending upon the desired results. In segment 100, material 104 comprises a reflective thermo-set polyester coating. Alternatively, fluoropolymer, acrylic, or other coatings of suitable durability and aesthetic value may be used. Material 104 may be provided in a variety of colors, of varying opacity. Preferably, material 104 is completely opaque and highly reflective, so as to cover the surface material of substrate 102 with a desired reflective color. Typically, material 104 is white. Material 104 may be applied in a number of ways. As depicted in segment 100, material 104 is rolled on using a commercially available coating machine. Alternatively, material 104 may be painted on manually, be sprayed or sputtered on, or may be applied as an adhesive sheet.

After material 104 is applied, material 106 is then applied over material 104. Material 106 may also comprise a number of coatings, depending upon the desired results. Typically, material 106 comprises the same material as material 104. Alternatively, material 106 may comprise a different material, depending upon the desired characteristics of the coil being produced. As depicted in segment 100, material 106 comprises a reflective thermo-set polyester coating. Alternatively, fluoropolymer, acrylic, or other coatings of suitable durability and aesthetic value may be used. Material 106 may be provided in a variety of colors, of varying opacity and reflectivity. Material 106 may be of similar color and/or opacity to material 104, and is typically, although not necessarily, white. Material 106 may also be applied in a number of ways. As depicted in segment 100, material 106 is rolled on using a commercially available coating machine. Alternatively, material 106 may be painted on manually, be sprayed or sputtered on, or may be applied as an adhesive sheet.

Material 108 is applied as a topcoat to the outer surface of substrate 102. This may be done before, after, or concurrent with the application of materials 104 and 106. Material 108 may comprise a number of cosmetic, aesthetic or functional coatings, depending upon the desired results. In segment 100, material 108 comprises a polyester coating of a desired color and gloss. Alternatively, fluoropolymer, acrylic, or other industrial coatings of suitable durability and aesthetic value may be used, as well as conventional paints or glosses. Material 108 may be provided in a variety of colors, of varying opacity. Preferably, material 108 is completely opaque, so as to cover the surface material of substrate 102 with a desired color or appearance. Material 108 may be applied in a number of ways. As depicted in segment 100, material 108 is rolled on using a commercially available coating machine. Alternatively, material 108 may be painted on manually, be sprayed or sputtered on, or may be applied as an adhesive sheet.

In segment 100, materials 104 and 106 are applied in separate steps. In alternative embodiments, however, materials 104 and 106 may be applied together in a single step, especially where they comprise the same material having the same characteristics. The combined layers of materials 104 and 106 provide a significant advantage in improving the overall reflectivity of the product. Although the combined thickness of layers 104 and 106 can vary over a wide range, their combined thickness is typically within the range of 1.2 to 1.4 mils. This provides a significant improvement in the reflectivity over conventional methods, where the overall thickness of the reflective material is usually within the range of about 0.8 mils. In alternative embodiments of the present invention, where only material 104 or 106 is applied in a single layer, that layer is applied to a thickness within the range of 1.2 to 1.4 mils.

Again, the film coating comprising materials 104 and 106 is disposed on the backside surface of substrate 102 (i.e., the surface that is formed into the inner surface of a finished channel letter coil product). The coating comprising material 108 is disposed as a topcoat on the outer surface of substrate 102.

After material 104 is applied, segment 100 may be heated, if necessary, to form and set it in place. In one embodiment of the invention, heating of about 420° F.-500° F., for about 25 seconds, is sufficient. Persons skilled in the art will understand that heating temperatures and times will vary depending upon factors such as the specific type of thermo-set material used. This process is repeated after material 106 is applied. Alternatively, heating may be done only after both materials 104 and 106 are applied, depending upon their composition and the desired characteristics of segment 100. Persons skilled in the art will also recognize that, due to the heating of segment 100, the composition and characteristics of material 108 may dictate whether it is applied before, after, or concurrent with materials 104 and 106.

Figure 2:
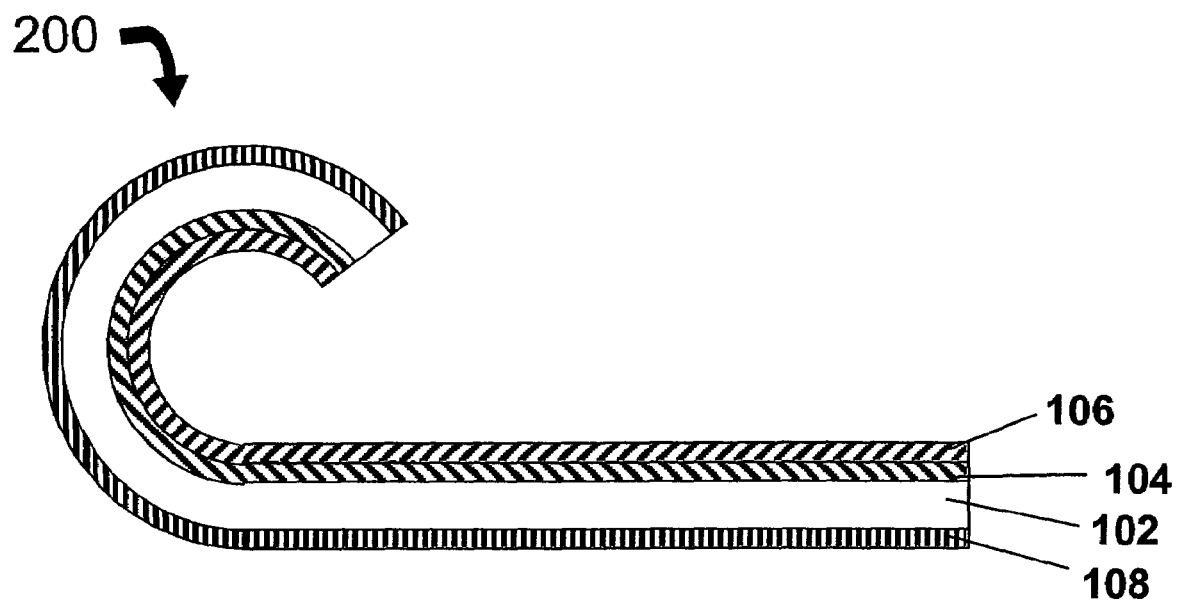
FIG. 2 illustrates another embodiment of channel letter coil according to the present invention.

After materials 104, 106, and 108 are securely disposed upon substrate 102, segment 100 is then rolled to form coil 200, as depicted in FIG. 2. Coil 200 now comprises finished channel letter coil material, ready for forming into finished channel letter coil products without requiring further application of reflective coatings or paints. The user may thereby produce signs of standard luminosity that require lower power, or may produce signs of standard power that provide increased luminosity. Depending upon the specific application, however, a user may optionally apply further coatings or paints to effect a desired cosmetic effect (e.g., unusual color, etc.).

While the invention has been described in reference to illustrative embodiments, the description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method of producing signage with increased reflectivity using channel letter coil, comprising the steps of:

providing a metal substrate having a first and second surface, the first surface being an inner surface of the metal substrate;

disposing a first material upon the first surface of the metal substrate, wherein the first material comprises a thermo-set polyester with a highly reflective surface;

disposing a second material upon the first material, wherein the second material comprises a thermo-set polyester with a highly reflective surface, and wherein no additional material is required to provide a highly reflective surface to the metal substrate;

disposing a third material upon the second surface, the second surface being an outer surface, wherein the third material is different from the first material, and wherein the disposed first, second and third materials and metal substrate collectively form a coated substrate, forming the coated substrate into shapes of individual characters to produce signage with increased reflectivity.

2. The method of claim 1, further comprising the step of disposing an aesthetic material upon the second surface of the substrate, opposite the first surface, prior to disposing the channel letter coil upon or within the signage substrate.

3. The method of claim 2, wherein the step of disposing an aesthetic material further comprises disposing a fluoropolymer coating.

4. The method of claim 2, wherein the aesthetic material is disposed manually.

5. The method of claim 2, wherein the aesthetic material is disposed using a coating machine.

6. The method of claim 1, wherein the metal substrate comprises an aluminum substrate.

7. The method of claim 1, wherein the thermo-set polyester is colored.

8. The method of claim 1, wherein the thermo-set polyester is disposed manually.

9. The method of claim 1 , wherein the thermo-set polyester is disposed using a coating machine.

10. The method of claim 1, wherein the thermo-set is opaque.

11. The method of claim 10, wherein the substrate is a readily formable metal.

12. The method of claim 1, wherein the finished channel letter coil requires no additional treatment before use.

13. The method of claim 1, further comprising the step of heating the substrate after the first material is disposed.

14. The method of claim 13, wherein the step of heating comprises heating to a temperature between about 420° F. and about 500° F., for a period of about 25 seconds.

15. The method of claim 1, wherein the first and second materials are disposed to a collective thickness of less than about 1.4 mils.

16. The method of claim 1 wherein the first and second materials are disposed to a collective thickness between about 1.2 mils and 1.4 mils.

17. The method of claim 1, further comprising the step of heating the substrate after the second material is disposed.

18. The method of claim 17, wherein the step of heating comprises heating to a temperature between about 420° F. and about 500° F., for a period of about 25 seconds.

19. The method of claim 1, wherein the first and second material are disposed in a single step.

20. A method of producing signage having increased reflectivity, comprising the steps of:

providing a metal substrate having a first and second surface;

disposing a first material upon the first surface of the metal substrate, wherein the first material has a reflective surface;

disposing a second material upon the first material, wherein the second material has a reflective surface, wherein the first material and the second material are disposed to a collective thickness of less than about 1.4 mils and wherein no additional material is required to provide a highly reflective surface to the metal substrate;

disposing a third material upon the second surface, the second surface being an outer surface, wherein the third material is different from the first and second material and wherein the disposed materials and the metal substrate together form a coated metal substrate; and forming the coated metal substrate into shapes of individual characters to form a channel formation, wherein the channel formation has increased reflectivity, as compared to the reflectivity achieved in a channel formation where reflective coatings or paints are applied to the surface of the channel formation.

* * * * *